United States Patent [19]

Brac

[11] Patent Number: 4,827,456

[45] Date of Patent: May 2, 1989

[54] METHOD AND DEVICE FOR DETERMINING THE REMOTE EMISSION SIGNATURE OF A SEISMIC EMISSION ASSEMBLY

[75] Inventor: Jean Brac, Royan, France

[73] Assignee: Institut Francais du Petrole, Rueil-Malmaison, France

[21] Appl. No.: 863,795

[22] Filed: May 16, 1986

[30] Foreign Application Priority Data

May 17, 1985 [FR] France .................................. 85 07582

[51] Int. Cl.$^4$ .............................................. G01V 1/16
[52] U.S. Cl. ...................................... 367/23; 181/110
[58] Field of Search ...................... 367/22, 23, 24, 144, 367/65; 181/110; 73/149

[56] References Cited

U.S. PATENT DOCUMENTS

| | | | |
|---|---|---|---|
| 3,398,394 | 8/1968 | Luehrmann et al. | 73/299 |
| 3,866,161 | 2/1975 | Barr, Jr. et al. | 367/21 X |
| 3,919,685 | 11/1975 | Haill | 367/65 |
| 4,476,550 | 10/1984 | Ziolkowski et al. | 367/23 X |
| 4,476,553 | 10/1984 | Ziolkowski et al. | 367/23 X |
| 4,486,864 | 12/1984 | Ongkiehong et al. | 367/23 X |
| 4,500,978 | 2/1985 | Ziolkowski et al. | 367/23 X |
| 4,599,892 | 7/1986 | Doshi | 73/290 B |
| 4,704,902 | 11/1987 | Doshi | 73/290 V |

FOREIGN PATENT DOCUMENTS 0066423 8/1982 European Pat. Off. .

OTHER PUBLICATIONS

Anton Ziolkowski, "A Method for Calculating the Output Pressure Waveform From an Air Gun", Geophys J.R. soc, (1970) 21, 137–161.

Primary Examiner—Thomas H. Tarcza
Assistant Examiner—Tod R. Swann
Attorney, Agent, or Firm—Antonelli, Terry & Wands

[57] ABSTRACT

A method and device are provided for determining the remote emission signature of a seismic emission array. Interactions make the signatures of the different sources different from those that they have separately. To overcome this difficulty, a catalogue is drawn up of the signatures of the sources actuated separately, as a function of parameters such as the immersion depth for example. Then, during combined use of the sources, the value of the parameters is measured and the signatures are selected from the catalogue which each of the sources would have separately if the parameters had the same values as those which are measured. The overall remote signature of the device is obtained by combining the selected signatures.

9 Claims, 2 Drawing Sheets

FIG.1 FIG.2
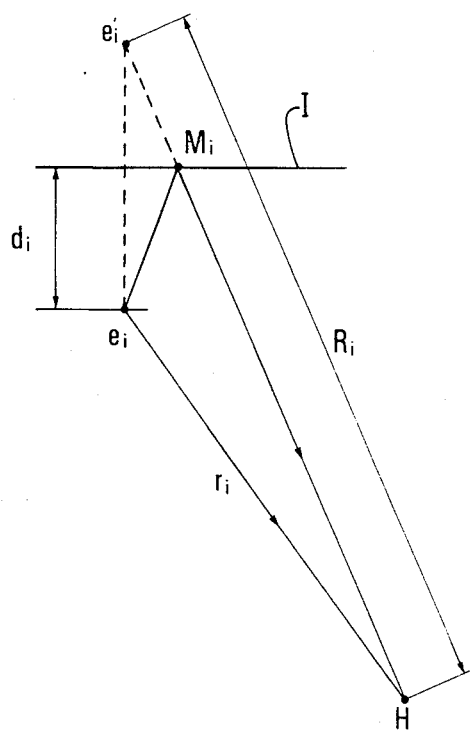
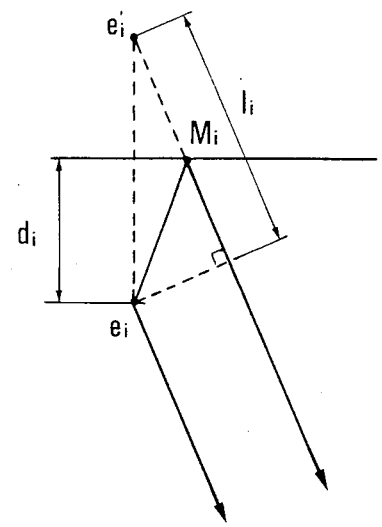
FIG.3
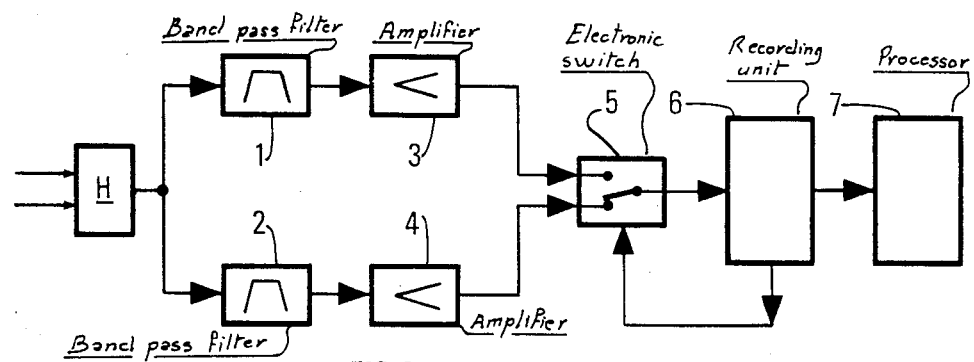
FIG.4
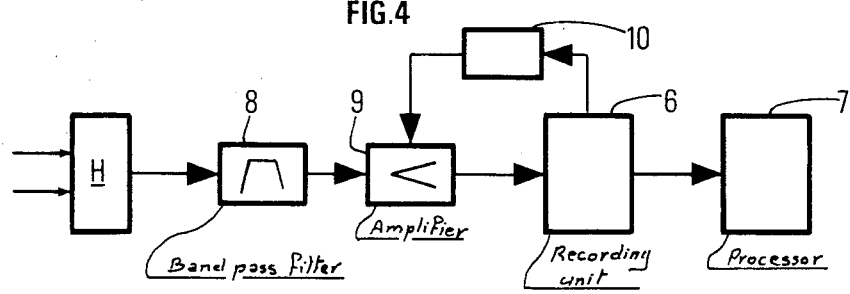

METHOD AND DEVICE FOR DETERMINING THE REMOTE EMISSION SIGNATURE OF A SEISMIC EMISSION ASSEMBLY

BACKGROUND OF THE INVENTION

1. Field of the Invention

The invention relates to a method of determining the remote signature of an assembly emitting seismic pulses in water, comprising an array of seismic sources and in particular an array of seismic sources operating by implosion, and a device for implementing the same.

2. Description of Prior Art

Emission of seismic pulses in water may be obtained for example by the sudden contraction of an immersed cavity in which there exists a very low pressure with respect to the hydrostatic pressure. This cavity may be defined by the walls of an enclosure of variable volume of the type described for example in the French Pat. No. 1 583 737.

It may also be obtained by the high speed discharge into the water of a certain volume of pressurized liquid contained in an immersed chamber. A source of the water gun type is described for example in the French Pat. No. 2,558,600.

The seismic pulses generated have a form which depends on the type of source used, on its mechanical characteristics, possibly on the pressure of the hydraulic propellent fluid for ejecting the liquid and also on its immersion depth.

The form of the seismic pulses generated by a given source, which forms the emission signature, thereof, is in general readily reproducible under defined conditions of use and only depends on the immersion depth. It will be determined by means of a pressure sensor disposed in the vicinity.

When several sources are actuated in combination, they interact with each other in a complex way so that the signature of each of them, measures by a near-by pressure sensor, is different from the one which is obtained when it operates separately.

For certain processing operations carried out on the recordings obtained by picking up the echoes from the different reflecting layers of the sub soil, it is important to know the overall signature at infinity of the whole of the combined sources. Such a signature may be obtained by a linear combination of the signatures of the different sources considered separately. This is impossible to do directly from the measurements made by different pressure sensors immersed in the vicinity of the different sources because of the interactions which occur.

A known method for determining the overall signature of an array of sources consists in immersing as many pressure sensors as there are sources, the position of the sensors with respect thereto being known, processing their different measurements while taking into account the interactions so as to determine the equivalent signatures of these sources, corrected for interaction effects and superimposing the corrected signatures so as to obtain the remote global signature.

Such a method which is applied to air guns and described in the published European patent application No. 66.423 is difficult to put into practice for it requires a precise knowledge of the position of the different sensors and of the different sources with respect to each other at the firing times, and this is all the more difficult to realise the higher the number of elements of the emission device.

With the method of the invention, the overall remote emission signature may be determined of an emission array comprising a number N of combined sources, which does not have the drawbacks mentioned above.

SUMMARY OF THE INVENTION

It is characterized in that it comprises:

measurement of the emission signatures of each of the N sources actuated separately, prior to the use of the emission array, for different parameter values influencing the form of the pulses produced by the sources, by means of appropriate sensors disposed in the vicinity of each of the N sources and provision of a catalogue of all the measurements carried out successively for all the sources of the emission array, measurement of the effective values of these same parameters for all the sources, at the time of their combined use, selection from the catalogue of the respective signatures of the N sources of the emission array corresponding to the effective values measured for said parameters, and determination of the overall remote emission signature of the emission array by a linear combination of the N emission signatures selected from the catalogue taking into account the effective firing times of the different sources of the emission array.

With the previous establishment of the catalogue of signatures of the different sources each operating separately and consequently free of the disturbances caused by their combined use, and since the measurement of the operating parameters of each source allows the catalogued emission signature to be selected which it would have under the same operating conditions if it emitted alone, it is possible by synthesis to determine the overall remote signature of the emission array, without needing to know the relative configuration of the sources and of the measurement sensors.

The parameters influencing the form of the pulses produced are the depth and possibly other parameters dependent on the type of source used.

BRIEF DESCRIPTION OF THE DRAWINGS

Other features and advantages of the method of the invention and the device for implementing same will be clear from the following description of particular embodiments, given by way of non limitative examples and illustrated by the accompanying drawings in which:

FIG. 1 shows schematically the paths of the sound waves between a source position $e_i$ close to the surface of the water I and that of a sensor H disposed at a certain distance from the source FIG. 2 is similar to FIG. 1 and corresponds to the case where the sensor is moved back to infinity, FIG. 3 shows the block diagram of a first embodiment of the device of the invention, FIG. 4 shows the block diagram of a variant of the embodiment of FIG. 3.

DESCRIPTION OF THE PREFERRED EMBODIMENTS

Figure 5:
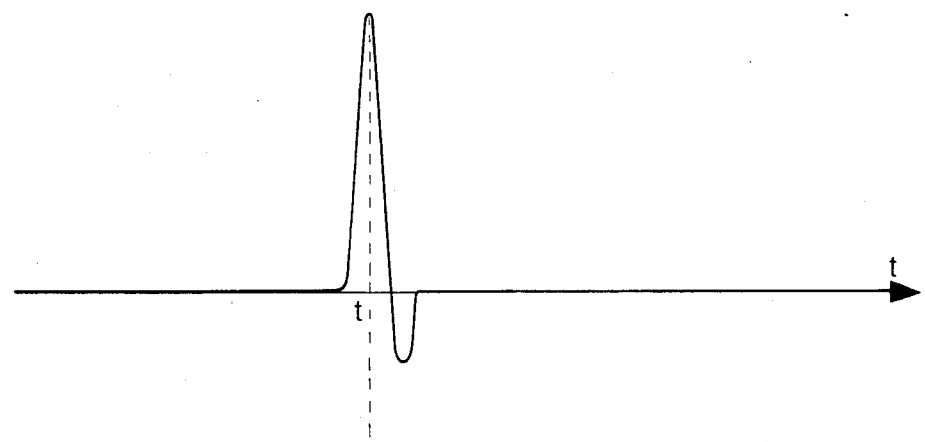
FIG. 5 shows very schematically a source signature.

The signature of a source $e_i$ is the variation as a function of time t of the pressure measured by the sensor H resulting from the sound pulse emitted by the source after firing.

The near field signature $s_i$ is measured at a reference distance $r_1$ of the order of 1 meter for example. The signature of the source, measured at a certain distance below the source, is a combination of the pulse which is propagated directly from $e_i$ to H with that, designated generally by a "ghost", which comes to the sensor with a time shift after reflection at a point $M_i$ on the water/air interface I.

When several sources $e_i$ are disposed at depths $d_i$, they are fired so as to bring their respective implosion peaks into phase. The time lag between the firing time of any two sources corresponds to the propagation time of the sound waves from one to the other, at the propagation speed V.

The far field signature of an array of N sources $e_i$, measured by the hydrophone H is expressed in a known manner by the relationship:

$$S_H(t) = \sum_{i=1}^{N} \frac{r_1}{r_i} s_i \left(t - \frac{d_i}{V} - \frac{r_i}{V}\right) + \rho \frac{r_1}{R_i} s_i \left(t - \frac{d_i}{v} - \frac{R_i}{V}\right) \quad (1)$$

where $s_i$ is the signature of the source $e_i$, $r_i$ and $R_i$ are respectively the distances $e_iH$ and $e_iM_iH$, and $\rho$ is the coefficient of reflection of the water/air interface which is very little different from $-1$.

It can be shown, and it is well known by specialists, that the signature S at infinity or at least at a very great distance (FIG. 2) of a transmission array formed by a number N of implosion sources, $e_1, e_2 ... e_N$ fired in sequence so as to bring their implosion peaks into phase, is a linear combination of the signatures $s_i$ of the different sources $e_i$ considered separately and is expressed by a relationship of the type:

$$S(t) = \sum_{i=1}^{N} s_i \left(t - \frac{d_i}{V}\right) + \rho s_i \left(t - \frac{d_i}{V} - \frac{l_i}{V}\right) \quad (2)$$

where $l_i$ represents the projection, on the recombination direction, of the distance between each source $e_i$ and its image $e'_i$. This relationship is independent of the geometry of the emission array, that is to say the relative position of the different sources with respect to each other and the interactions therebetween.

The method of the invention comprises the previous measurement of the emission signatures of each of the sources $e_i$ actuated separately by a hydrophone disposed at a short distance (1 meter for example) for different values of the parameters influencing the form of the pulses produced. The main parameter is the immersion depth.

Other parameters, related more specifically to the nature of the sources, such as the pressure of the fluid ejected in the case of implosion guns, are also taken into account.

The measured emission signatures are preferably corrected so as to eliminate therefrom the contributions due to reflections from the water/air interface I ("ghosts"). With the measurements made in the immediate vicinity of each source $e_i$, the relative intensity of the "ghosts" with respect to those of the direct pulses, is relatively small, of the order of 1/10.

A catalogue is then drawn up of all the measurements made successively for all the sources. The data of this catalogue is stored for example in a processor memory.

When the emission array is towed in the water during seismic prospection operations at sea, and when its different sources are actuated, the procedure is as follows:

By means of hydrophones disposed in the immediate vicinity of each of them, their respective immersion depths are measured. If required the values of other parameters influencing their signatures are also measured by means of other appropriate sensors.

The emission signatures of the different sources are recorded so as to determine the respective times of their implosion peaks and also to detect possible anomalies or operating troubles.

Each of the emission signatures taken from the catalogue is modified so as to add thereto the contribution to the reflections from the interface, which will be observed at a very great distance at the effective depth of use of the corresponding source. The contribution of the "ghost" to the emission signature of the source is, at infinity, practically identical to that of the direct wave, from the amplitude point of view.

The modification consists essentially in adding to each emission signature that of a "ghost" of equal amplitude suitably phase shifted.

Then a linear combination of the modified signatures is made in agreement with relationship 2. Preferably, the modified signatures are phase shifted before their combination so as to take into account the time intervals between the respective firing times of the different sources, whether they are introduced deliberately or result from a certain dispersion in the operating conditions.

Then the signature at infinity which has been synthesized by this combination may be used for different processing operations on the seismic recordings made from echoes on the underground reflectors, of the seismic shocks generated by the source array.

The two steps for correcting or modifying the signatures before inclusion thereof in the catalogue for eliminating the contribution of the ghost at infinity are optional. They may also be carried out at the time of drawing up the catalogue, so as to collect in this latter examples of signatures at infinity ready for the combinations.

The method is advantageously put into practice by using reception means adapted for measuring alternately the immersion depth of each source and its emission signature, the immersion depth at the precise time of its firing being determined by combining previous and subsequent depth measurements at the time of firing.

The device for implementing the method comprises for each of the sources a single sensor H disposed nearby and connected to the input of a data acquisition system shown in FIG. 3. The signal delivered by sensor H is applied to the input of two different amplification channels each comprising a band pass filter 1, 2 and an amplifier 3, 4.

The two amplifiers 3, 4 have different gains $g_1$ and $g_2$. The signals which they deliver are applied to two inputs of an electronic switch 5, the output of this latter being connected to the input of a digitization and recording unit 6. This unit comprises means for storing the different emission signatures forming the catalogue and means for delivering a signal for controlling the switch 5, for selecting one or other of the signals from the amplifiers 3 or 4.

A processor 7 is connected to the digitization and recording assembly 6. It is adapted for combining the emission signature selected from the catalogue for synthesizing the overall signature at infinity of the array of sources.

The gain of amplifier 3 is chosen sufficiently large so that the signal which it delivers forms a precise measurement of the hydrostatic pressure and, consequently, of the immersion depth of the associated source.

That of amplifier 4 is chosen smaller so that the signal at its output faithfully restores, without chopping, the pressure variations generated by the source when fired.

Figure 6:
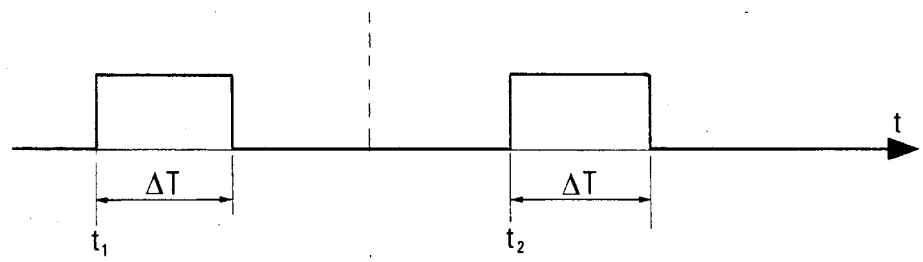
FIG. 6 shows a timing diagram of a control signal for using a sensor both for measuring the immersion depth of the source and for determining its emission signature.

With a source to be fired at time t (FIG. 5), the immersion depth is measured at a prior time $t_1$ and a subsequent time $t_2$ (FIG. 6). For this, unit 6 applies to switch 5 at times $t_1$ and $t_2$ and during a time interval or window $\Delta T$, a control signal for selecting the amplifier 3.

The two depth measurements on each side of the firing time t are stored successively and processor 7 performs an interpolation therebetween so as to determine accurately the immersion depth of the source at the firing time. Outside these two depth measurement windows, the switch is controlled for selecting the signal delivered by amplifier 4 which represents the emission signature of the source.

In another embodiment (FIG. 4), the data acquisition signal may comprise a signal amplification channel comprising a band pass filter 8 and a variable gain amplifier 9 whose gain may assume at least two different gain values $g_1$, $g_2$ depending on the control signal which is applied thereto by a gain control element 10 driven by the recording unit 6. The gain $g_1$ for fine measurement of the immersion depth is applied to amplifier 9 at times $t_1$ and $t_2$ and for a time interval $\Delta T$.

Gain $g_2$ is applied outside the measurement windows so as to obtain the emission signature of the source. Similarly, processor 7 determines the precise value of the immersion depth by interpolations between the values measured at times $t_1$ and $t_2$.

What is claimed is:

1. A method of determining the remote signature of an emission array emitting seismic pulses in water and comprising a plural number N of seismic sources, comprising:

measuring the emission signatures of each of the N sources actuated separately, one at a time, prior to the use of the emission array, for different values of parameters influencing the form of the pulses produced by the source, by means of respective sensors disposed in the vicinity of each of the N sources and storing said emission signatures in the form of a catalogue of all the measurements made successively for all of the sources of the emission array in accordance with each of the differnt values of parameters employed;

measuring the effective values of these same parameters for all the sources, at the time of the combined use thereof;

selecting emission signatures from the catalogue of the respective emission signatures of the N sources of the emission array corresponding to the effective value measured for said parameters; and determining the overall remote emission signature of the emission array by effecting a linear combination of the N emission signatures selected from the catalogue, taking into account the effective firing times of the different sources.

2. The method as claimed in claim 1, wherein a catalogue is drawn up of the emission signatures of each of the N sources of the emission array at a plurality of different immersion depths, measurement of said effective values comprising the use of signature measurement sensors.

3. The method as claimed in claim 1, wherein a catalogue is drawn up of the emission signatures of each of the N sources of the emission array by varying the operating parameters of said source.

4. The method as claimed in one of the preceding claims, wherein the immersion depth of each of the sources is determined by combining the depth measurements made before and after the emission of each seismic pulse.

5. A method as claimed in claim 2, wherein signature measurement sensors are used alternately for depth measurement by application to the signals provided by said sensors of a different amplification gain.

6. A system for determining the remote signature of an emission array emitting seismic pulses in water comprising a plural number N of seismic sources; reception means for picking up the sound waves emitted by the N seismic sources for effecting seismic prospecting, including a respective sensor disposed in the vicinity of each seismic source; and a data acquisition device including means for amplifying signals received from said reception means with a selected gain, means for digitizing the amplified signals and for recording the digitized signals so that the values of signals with different gains from the same sensor are associated, means for storing emission signatures in the form of a catalogue of signatures stored in accordance with associated values of parameters related to said signatures, processing means for processing said digitized signals on the basis of said stored emission signatures, and selection means for applying to said digitization and recording means signals provided by said sensors that are amplified with a different gain depending on whether the signal relates to emersion depth of the source or its emission signature, wherein said amplification means comprises two amplifiers for amplifying concurrently the signals delivered by each sensor, and said selection means comprises a switch actuated by said digitization and recording means before and after emission of each seismic pulse.

7. A system as claimed in claim 6, wherein one of said signals delivered by a sensor to the one of said two amplifier means having the higher gain indicates a depth measurement of a seismic source and the other of said signals delivered by the same sensor to the other of said two amplifier means having the lower gain indicates the signature of said seismic source.

8. A system for determining the remote signature of an emission array emitting seismic pulses in water comprising a plural number N of seismic sources; reception means for picking up the sound waves emitted by the N seismic sources for effecting seismic prospecting, including a respective sensor disposed in the vicinity of each seismic source; and a data acquisition device including means for amplifying signals received from said reception means with a selected gain, means for digitizing the amplified signals and for recording the digitized signals so that the values of signals with different gains from the same sensor are associated, means for storing emission signatures in the form of a catalogue of signatures stored in accordance with associated values of parameters related to said signatures, processing means for processing said digitized signals on the basis of said stored emission signatures, and selection means for applying to said ditigization and recording means signals provided by said sensors that are amplified with a different gain depending on whether the signal relates to emersion depth of the source or its emission signature, wherein said amplification means comprises a single variable gain amplifier for amplifying the signals delivered by each sensor, and said selection means comprises an element actuated by said digitization and recording means for generating a control signal for giving alternately two different values to the gain of said amplifier.

9. A system as claimed in claim 8, wherein the gain value applied to a signal indicating a depth measurement of a seismic source is higher than the other gain value that is applied to a signal indicating the signature of said last-mentioned seismic source.

* * * * *